US008229598B2

(12) United States Patent
Suzuki et al.

(10) Patent No.: US 8,229,598 B2
(45) Date of Patent: Jul. 24, 2012

(54) VIBRATION SUPPRESSING DEVICE FOR MACHINE TOOL

(75) Inventors: Norikazu Suzuki, Nagoya (JP); Eiji Shamoto, Nagoya (JP); Akihide Hamaguchi, Niwa-Gun (JP)

(73) Assignees: Okuma Corporation, Niwa-gun (JP); National University Corporation Nagoya University, Nagoya-Shi (JP)

( * ) Notice: Subject to any disclaimer, the term of this patent is extended or adjusted under 35 U.S.C. 154(b) by 969 days.

(21) Appl. No.: 12/190,780

(22) Filed: Aug. 13, 2008

(65) Prior Publication Data
US 2009/0069927 A1 Mar. 12, 2009

(30) Foreign Application Priority Data
Sep. 6, 2007 (JP) ................................. 2007-231918

(51) Int. Cl.
*G06F 19/00* (2011.01)
(52) U.S. Cl. .............................. 700/279; 702/56; 73/597
(58) Field of Classification Search .......... 700/279–280; 702/56; 73/597, 656–660
See application file for complete search history.

(56) References Cited

U.S. PATENT DOCUMENTS

| | | | | |
|---|---|---|---|---|
| 4,025,724 A | * | 5/1977 | Davidson et al. | 381/71.2 |
| 4,435,751 A | * | 3/1984 | Hori et al. | 700/280 |
| 6,223,102 B1 | * | 4/2001 | Busch | 700/279 |
| 6,697,759 B2 | * | 2/2004 | Saarinen et al. | 702/145 |
| 6,748,300 B2 | * | 6/2004 | Sato | 700/304 |
| 6,883,373 B2 | * | 4/2005 | Dyer | 73/462 |
| 7,155,973 B2 | * | 1/2007 | Dyer | 73/462 |
| 7,381,017 B2 | * | 6/2008 | Wang et al. | 409/131 |
| 7,501,783 B2 | * | 3/2009 | Imadu et al. | 318/611 |
| 2005/0160811 A1 | * | 7/2005 | Dyer | 73/462 |
| 2008/0289923 A1 | * | 11/2008 | Suzuki et al. | 188/379 |
| 2009/0069927 A1 | * | 3/2009 | Suzuki et al. | 700/177 |

FOREIGN PATENT DOCUMENTS
JP 2000-210840 A1 8/2000
* cited by examiner

*Primary Examiner* — Kidest Bahta
(74) *Attorney, Agent, or Firm* — Burr & Brown (57) ABSTRACT

A calculating member carries out Fourier analysis of a vibrational acceleration to calculate a maximum acceleration and frequency thereof. The calculating member then compares the maximum acceleration with a threshold value, and when the acceleration exceeds the threshold value, the calculating member calculates a k-value and phase information, and stores each calculated value. When retrying is selected, the calculating member determines a type of a current chatter vibration from the phase information, determines the existence of a chatter vibration which is different from the determined chatter vibration, and calculates each new phase information according to the determined chatter vibration and an existence of a different chatter vibration which had been generated before generation of the current vibration. The calculating member then calculates a k1-value from new phase information, calculates the optimum rotation speed by using the k1-value, and changes the rotation speed to the optimum rotation speed.

8 Claims, 6 Drawing Sheets

VIBRATION SUPPRESSING DEVICE FOR MACHINE TOOL

BACKGROUND OF THE INVENTION

This application claims the benefit of Japanese Patent Application Numbers 2007-231918 filed on Sep. 6, 2007, the entirety of which is incorporated by reference.

1. Field of the Invention

The present invention relates to a vibration suppressing device for suppressing a vibration generated during machining in a machine tool by rotating of a tool or a work.

2. Description of the Background Art

There has conventionally been a machine tool, for example, where a work is supported by a rotatable main spindle and machined while a tool is being fed to the work. In the machine tools, when a cutting depth in cutting procedure is very large, a so-called "chatter vibration" is generated during the machining, resulting in deterioration in finishing accuracy of a machined surface, rapid wearing of a tool, and chipping a tool. Particularly, a "regenerative type chatter vibration" as a self-excited vibration is generated between the tool and the work, and a "forced chatter vibration" is caused from a machine tool having the tool. In this case, a process for suppressing the regenerative type chatter vibration and a process for suppressing the forced chatter vibration are incompatible. Thus, as described in Patent document 1, it has been found necessary to determine whether a generated chatter vibration is the regenerative type chatter vibration or the forced chatter vibration to carry out a vibration suppressing process proper for each vibration.

[Patent document 1] Japanese Unexamined Patent Publication No. 2000-210840

SUMMARY OF THE INVENTION

However, in a method described in Patent document 1, a vibration suppressing process is carried out by considering only the current chatter vibration. Thus, when both the regenerative type chatter vibration and the forced chatter vibration are generated at the time of changing a main spindle rotation speed, a process for suppressing the regenerative type chatter vibration may excite the forced chatter vibration, or a process for suppressing the forced chatter vibration may excite the regenerative type chatter vibration. Therefore, there has been a problem that the chatter vibration cannot be suppressed or a bigger chatter vibration is generated.

Therefore, an objective of the present invention is to provide a vibration suppressing device for a machine tool which can obtain an optimum rotation speed for respective cases where only the regenerative type chatter vibration is generated, only the forced chatter vibration is generated, and both the regenerative type chatter vibration and the forced chatter vibration are generated. Further, the vibration suppressing device can suppress a chatter vibration safely and effectively without one chatter vibration suppressing process exciting the other chatter vibration.

In order to achieve the above-described object, a first aspect of the invention is a vibration suppressing device for a machine tool for suppressing a chatter vibration generated when a rotary shaft is rotated in the machine tool provided with the rotary shaft for rotating a tool or a work, the device including: detecting member for detecting time-domain vibration due to the rotating rotary shaft; calculating member for calculating a chatter frequency and frequency-domain vibration at the chatter frequency based on the time-domain vibration detected by the detection member, and calculating an optimum rotation speed of the rotary shaft capable of suppressing a chatter vibration, when the calculated frequency-domain vibration exceeds a predetermined threshold value, using a k-value and phase information, in which the k-value is an integer portion of a value obtained by dividing the chatter frequency by a product of number of tool blades and the rotary shaft rotation speed and the phase information is a decimal part of the value obtained by dividing the chatter frequency by a product of number of tool blades and the rotary shaft rotation speed; storing member for storing the k-value and the phase information; and rotation speed controlling member for rotating the rotary shaft at an optimum rotation speed calculated by the calculating member and the storing member, wherein the calculating member compares the calculated phase information with a predetermined constant to determine whether a generated chatter vibration is a forced chatter vibration or a regenerative type chatter vibration, determines whether or not a chatter vibration different from the determined chatter vibration determined before the current vibration is generated by using the phase information stored in the storing member, and changes the k-value according to an existence of generations of the determined chatter vibration and the different chatter vibration, so that the optimum rotation speed is calculated.

A second aspect of the invention is as follows in addition to the first aspect. In order to properly change the k-value, when the calculating member determines that a generated chatter vibration is the forced chatter vibration and the regenerative type chatter vibration had been generated before generation of the current vibration, the calculating member obtains a value calculated from the current phase information and phase information which is closest to the calculated phase information among phase information determined as the regenerative type chatter vibration, and makes this value be new phase information. When the regenerative type chatter vibration had not been generated before generation of the current vibration, the calculating member obtains a value by adding a decimal value which does not generate a forced chatter vibration to the calculated phase information, makes this value be new phase information, and determines the generated chatter vibration to be the regenerative type chatter vibration. When the calculating member determines that the generated chatter vibration is the regenerative type chatter vibration and the forced chatter vibration had been generated before generation of the current vibration, the calculating member obtains a value calculated from the current phase information and phase information which is the closest to the calculated phase information among stored phase information determined as the forced chatter vibration, and makes this value be new phase information. When the forced chatter vibration had not been generated before generation of the current vibration, the calculating member makes the number of 0 be new phase information and changes the k-value by adding the new phase information respectively to the calculated k-value.

A third aspect of the invention is as follows in addition to the second aspect. That is, when the forced chatter vibration is currently generated and the regenerative type chatter vibration had been generated before generation of the current vibration, and when the regenerative type chatter vibration is currently generated and the forced chatter vibration had been generated before generation of the current vibration, the calculating member obtains an average value of the current phase information and phase information which is closest to the calculated phase information, and makes this value be new phase information, in order to easily obtain new phase information.

A fourth aspect of the invention is as follows in addition to any one of the first to third aspects. That is, in order to properly calculate the optimum rotation speed using the changed k-value, the calculating member calculates the optimum rotation speed by dividing the chatter frequency by the product of the number of tool blades and the changed k-value.

In addition, at this time, when the tool has eccentricity, the number of tool blades can be 1.

A fifth aspect of the invention is as follows in addition to the second aspect. That is, when the calculating member determines that the generated chatter vibration is the forced chatter vibration and the regenerative type chatter vibration had been generated before generation of the current vibration, and when the calculating member determines that the generated chatter vibration is a regenerative type chatter vibration and the forced chatter vibration had been generated before generation of the current vibration, the calculating member obtains a value calculated from the current rotary shaft rotation speed and a rotary shaft rotation speed which is the closest to the current rotary shaft rotation speed among various rotary shaft rotation speeds determined as a chatter vibration different from the current vibration among stored spindle rotation speeds, and makes this value be the optimum rotation speed, in order to calculate the optimum rotation speed without using any phase information.

A sixth aspect of the invention is as follows in addition to the second aspect. That is, when the calculating member determines that the generated chatter vibration is the forced chatter vibration and the regenerative type chatter vibration had been generated before generation of the current vibration, and when the calculating member determines that the generated chatter vibration is the regenerative type chatter vibration and the forced chatter vibration had been generated before generation of the current vibration, the calculating member obtains an average value of the current rotary shaft rotation speed and a rotary shaft rotation speed which is closest to the current rotary shaft rotation speed among various rotary shaft rotation speeds determined as a chatter vibration different from the current vibration among stored spindle rotation speeds, and makes this value be the optimum rotation speed, in order to calculate the optimum rotation speed without using any phase information.

According to the invention of the first aspect, a vibration suppressing process is carried out considering both the regenerative type chatter vibration and the forced chatter vibration. Thus, one chatter vibration suppressing process can be carried out without exciting the other chatter vibration, and thus the optimum stable rotation speed can be constantly calculated. Further, since a bigger chatter vibration is not generated after the vibration suppressing process, a chatter vibration can be suppressed safely and effectively. Therefore, finishing accuracy of a machined surface can be kept to be high, and it can be expected to suppress the tool from wearing and prevent the tool from chipping.

In addition to the effect of the first aspect, the invention of the second aspect has the effect in which the k-value can be properly changed by adding new phase information to the calculated k-value.

In addition to the effect of the second aspect, the invention of the third aspect has the effect in which new phase information can be easily obtained.

In addition to the effect of any one of the first to third aspects, the invention of the fourth aspect has the effect in which the optimum rotation speed can be properly calculated by using the changed k-value.

In addition to the effect of the second aspect, the inventions of the fifth and sixth aspects have the effect in which the optimum stable rotation speed can be calculated with respect to both the forced and regenerative type chatter vibrations without using any phase information.

DESCRIPTION OF THE PREFERRED EMBODIMENTS

An embodiment of the present invention will be described below referring to the drawings.

Figure 1:
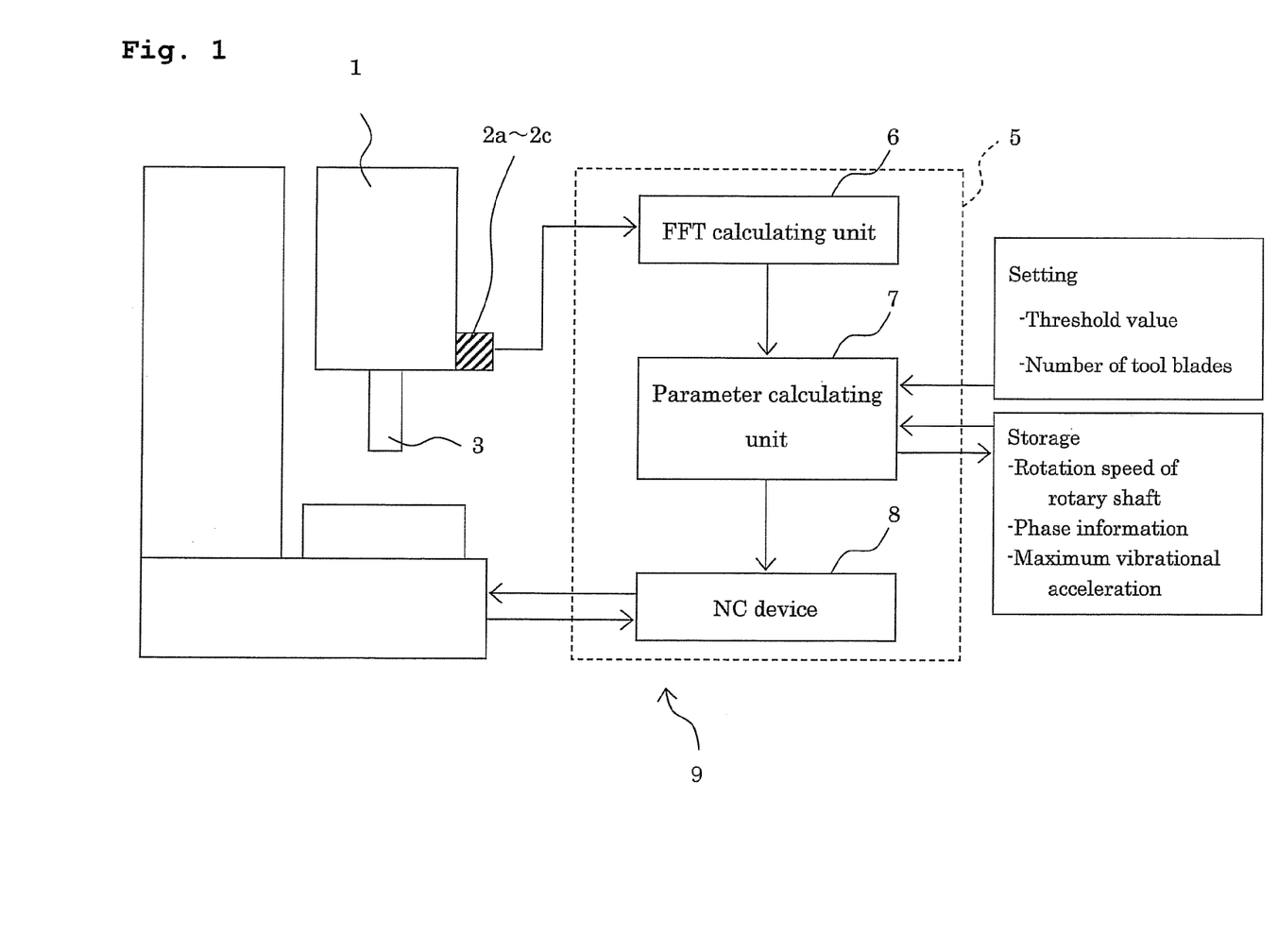
FIG. 1 is an explanatory diagram illustrating a block configuration of a vibration suppressing device.
Figure 2:
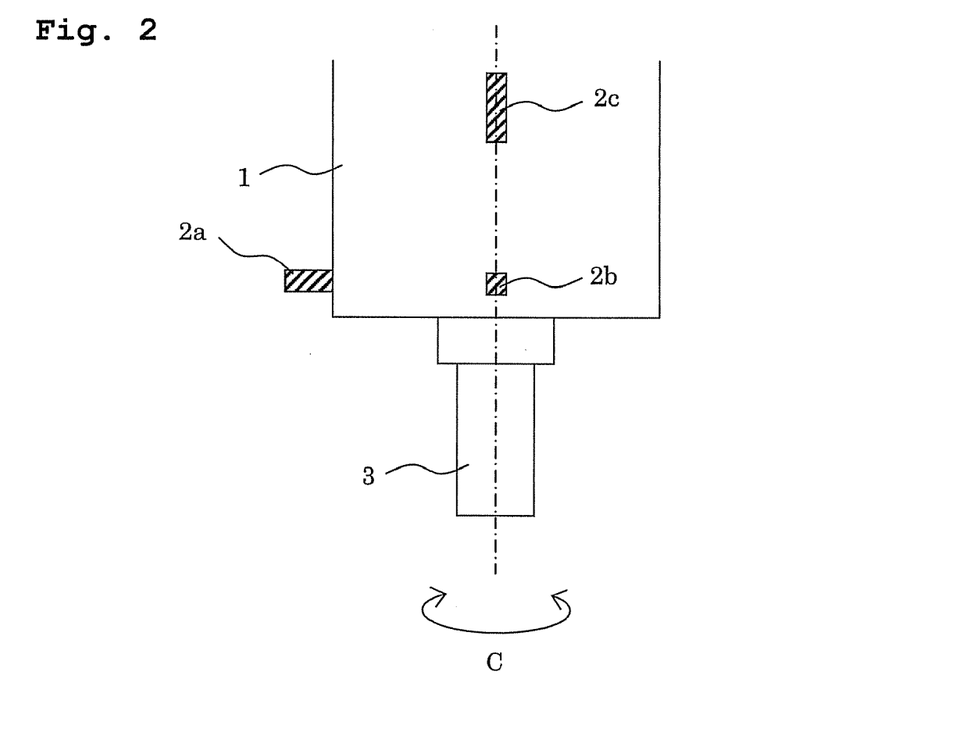
FIG. 2 is an explanatory diagram laterally illustrating rotary shaft housing, which is subject to vibration suppression.
Figure 3:
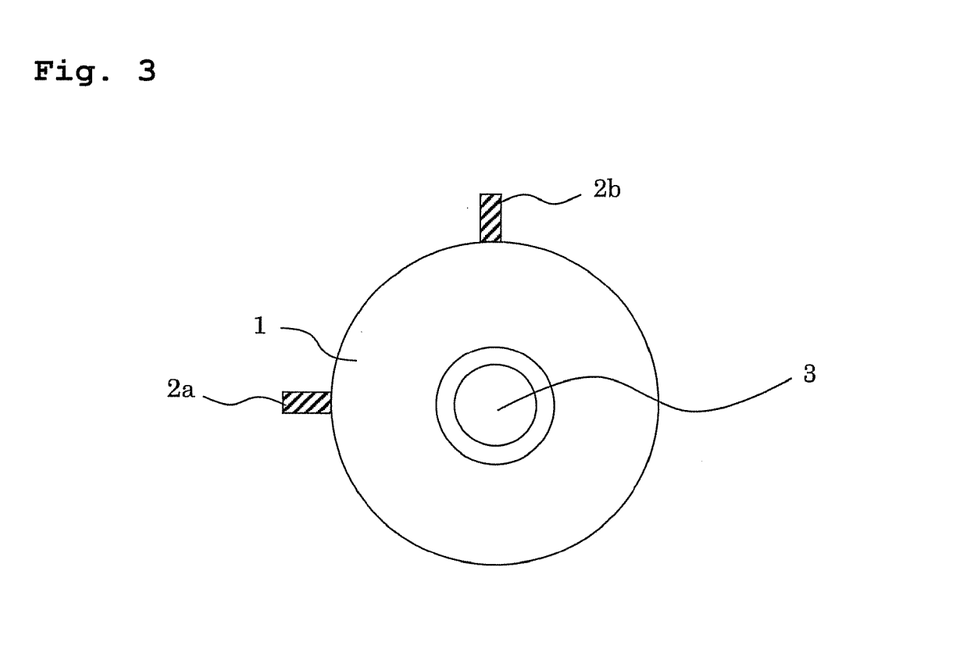
FIG. 3 is an explanatory diagram illustrating the rotary shaft housing in a shaft direction.

FIG. 1 is an explanatory diagram illustrating a block configuration of a vibration suppressing device. FIG. 2 is an explanatory diagram laterally illustrating a rotary shaft housing 1, which is subject to vibration suppression. FIG. 3 is an explanatory diagram illustrating the rotary shaft housing 1 in a shaft direction.

A vibration suppressing device 9 suppresses "chatter vibration" generated in a rotary shaft 3 rotatably provided around a C-axis of the rotary shaft housing 1. The vibration suppressing device 9 includes vibration sensors (detecting member) $2a$ to $2c$ for detecting time-domain vibrational accelerations generated at the rotating rotary shaft 3, and a control device (a calculating member and a rotation speed controlling member) 5 for controlling a rotation speed of the rotary shaft 3 based on values detected by the vibration sensors $2a$ to $2c$.

The vibration sensors $2a$ to $2c$ are attached to the rotary shaft housing 1 as illustrated in FIGS. 2 and 3. One of the vibration sensors detects the time-domain vibrational acceleration (which means a vibrational acceleration on a time axis) in a direction orthogonal to the other sensors (For example, the vibration sensors $2a$ to $2c$ detect the time-domain vibrational accelerations in respectively orthogonal X, Y, and Z directions).

The control device 5 includes a FFT calculating unit 6 for carrying out an analysis based on the time-domain vibrational accelerations detected by the vibration sensors $2a$ to $2c$, a parameter calculating unit 7 for storing a value calculated by the FFT calculating unit 6 and calculating the optimum rotation speed based on the current value and the stored value, an NC device 8 for controlling machining in the rotary shaft housing 1, and a memory (not illustrated). The control device 5 carries out an analysis as described later in the FFT calculating unit 6 and monitoring of a rotation speed of the rotary shaft 3.

Figure 8:
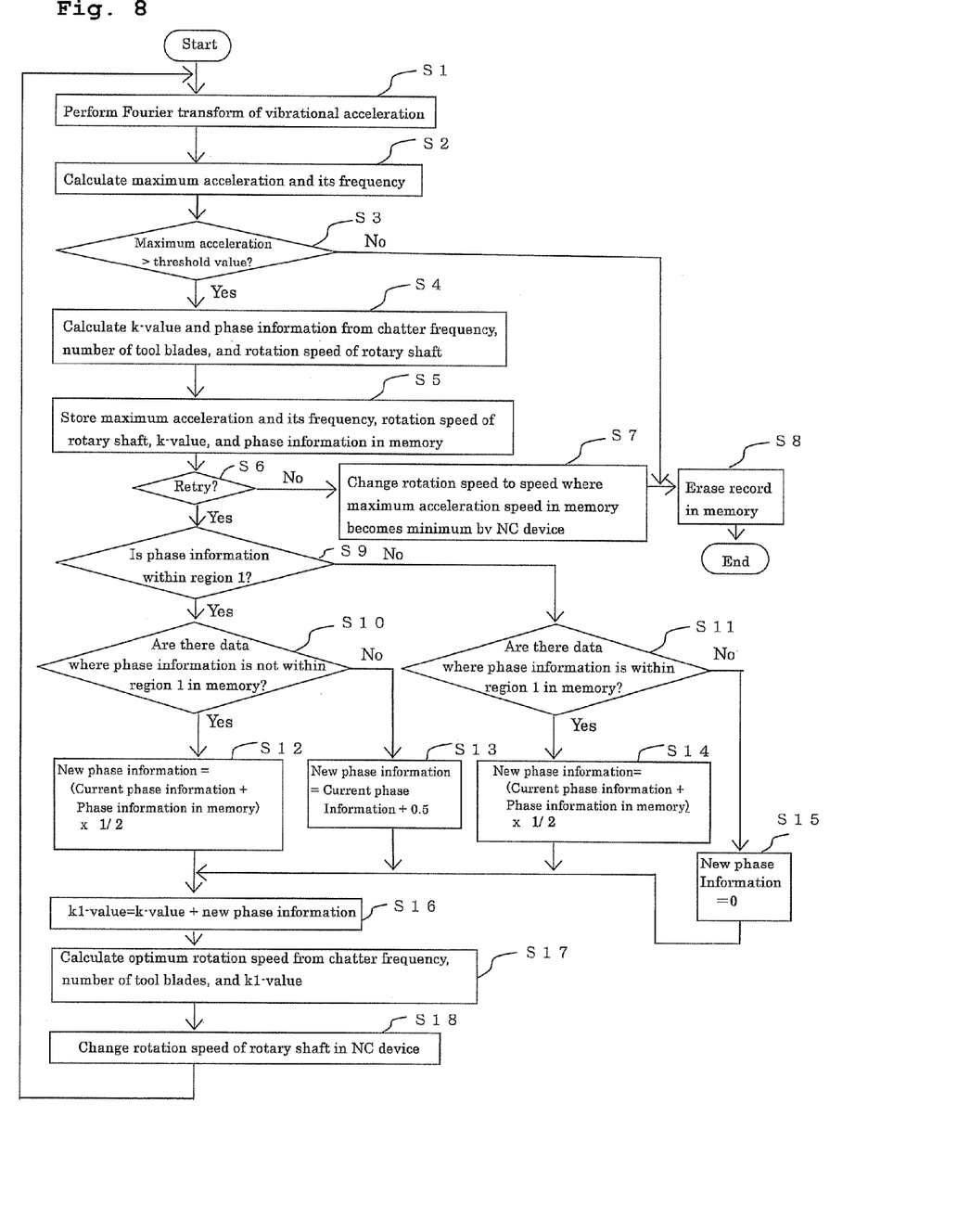
FIG. 8 is a flowchart pertaining to suppression control of a chatter vibration.

Suppression control of a "chatter vibration" in the control device 5 will be described referring to the flowchart in FIG. 8.

Figure 4:
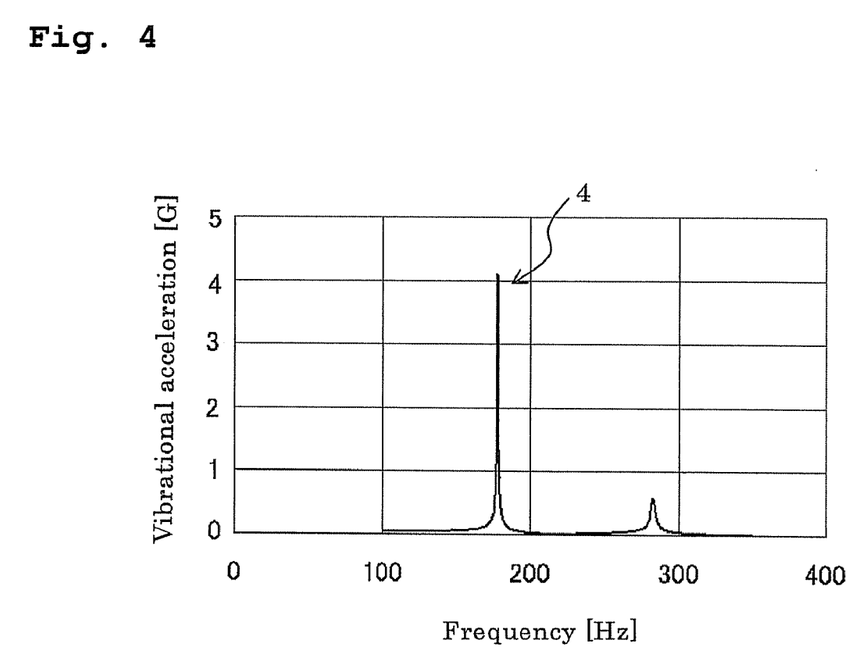
FIG. 4 is an explanatory diagram illustrating one example of a Fourier analysis result of time-domain vibrational accelerations.

When control starts, the FFT calculating unit 6 carries out a Fourier transform of the time-domain vibrational accelerations which is constantly detected during rotation in the vibration sensors 2a to 2c (S1), and calculates a maximum acceleration and its frequency (a chatter frequency) as shown by a numeral 4 in FIG. 4 (S2).

Then, the parameter calculating unit 7 compares the maximum acceleration calculated in S2 with a predetermined threshold value (S3). When the acceleration exceeds the threshold value, the parameter calculating unit 7 determines that a "chatter vibration" which has to be suppressed is generated at the rotary shaft 3 and calculates a k-value and phase information by following expressions (1) to (3) using the chatter frequency, the number of tool blades, and the rotation speed of the rotary shaft 3 (S4). When the maximum acceleration does not exceed the threshold value in the determination of S3, the parameter calculating unit 7 erases a record in the memory (S8), and processing ends.

$$k'\text{-value} = \text{Chatter frequency}/(\text{Number of tool blades} \times \text{Rotary shaft rotation speed}) \quad (1)$$

$$k\text{-value} = \text{Integer portion of the } k'\text{-value} \quad (2)$$

$$\text{Phase information} = k'\text{-value} - k\text{-value} \quad (3)$$

"Number of tool blades" in the expression (1) is deemed to be preset in the parameter calculating unit 7. "Rotary shaft rotation speed" in the expression (1) is a current rotation speed (before optimizing the rotation speed). "k'-value" in the expression (1) is a dimensionless number, and it is required to be a same dimension when unit dimensions of the chatter frequency and the rotary shaft rotation speed are different.

Then, in S5, in order to store the current vibrating state, the parameter calculating unit 7 stores the current rotary shaft rotation speed, the maximum acceleration and its frequency calculated in S2, and the k-value and phase information (a decimal part of the k'-value) calculated in S4 in the memory.

Then, in S6, the parameter calculating unit 7 determines whether or not control is needed to be retried. This determination may be carried out according to the repeating number of control. For example, the limited repeating number of control is set to be 1. When the data number stored in the memory is not more than the constant 1, it is determined that the optimum rotation speed is needed to be re-calculated. When the data number is more than the constant 1, it is determined that the maximum acceleration cannot to be lower than the threshold value, and thus the optimum rotation speed is not needed to be re-calculated.

Thus, when the parameter calculating unit 7 determines that control is needed to be retried in S6, the processing after S9 is carried out in order to re-calculate the optimum rotation speed. In addition, when the parameter calculating unit 7 determines that control is not needed to be retried in S6, the maximum acceleration in the memory is extracted to change the rotary shaft rotation speed to have a minimum acceleration by the NC device 8 in S7. Then, the parameter calculating unit 7 erases a record in the memory (S8), and ends the processing.

Figure 9:
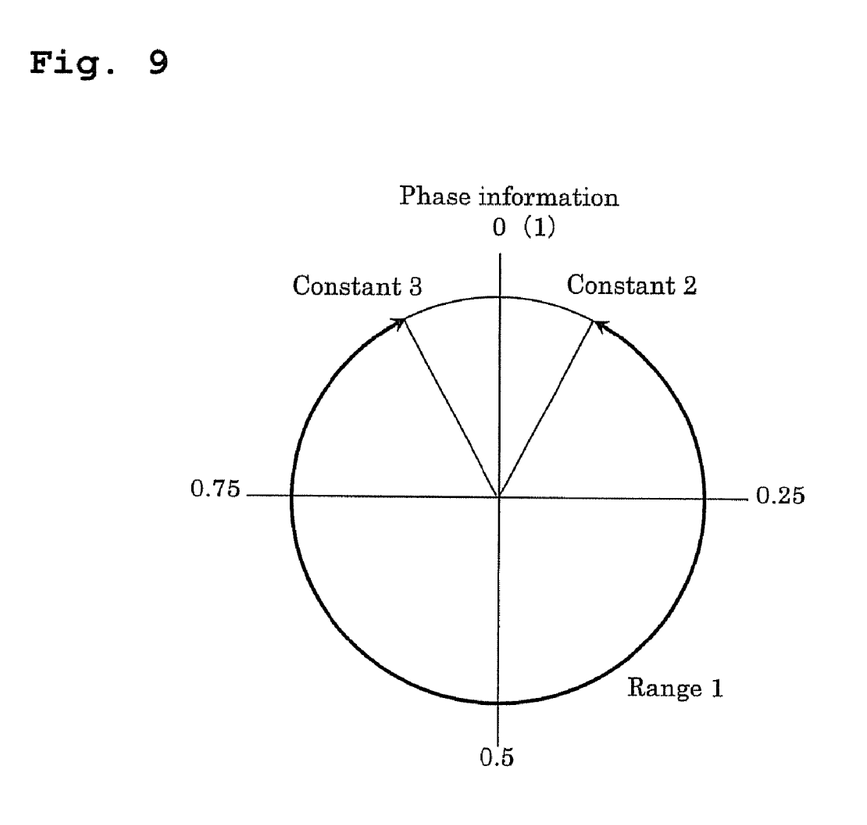
FIG. 9 is an explanatory diagram illustrating a range 1 of phase information.

On the other hand, in order to determine a type of the current vibration, the parameter calculating unit 7 compares phase information obtained by the expression (3) with constants 2 and 3 in S9. In this case, a range 1 is within a range from more than the constant 2 to less than the constant 3 as illustrated in FIG. 9. This range 1 means a range close to 0, and a range other than the range 1 is a range being far from 0.

Therefore, when the current phase information is in the range 1, the parameter calculating unit 7 determines that the forced chatter vibration is generated, and determines whether the data which has some phase information recorded in the memory not being within the range 1 exists in S10. When the current phase information is determined not being within the range 1 in S9, the parameter calculating unit 7 determines that a regenerative type chatter vibration is generated, and determines whether or not the data which has some phase information recorded in the memory being within the range 1 exists in S11.

Further, when the parameter calculating unit 7 determines that data which has phase information not being within the range 1 exists in S10, it is determined that a regenerative type chatter vibration had been generated before the generation of the current forced chatter vibration. Then, the parameter calculating unit 7 calculates new phase information based on a following expression (4) in S12. On the other hand, when the parameter calculating unit 7 determines that the data which has phase information not being within the range 1 do not exist in S10, it determines that a vibration except for the current forced chatter vibration has not been generated before. Then, the parameter calculating unit 7 calculates new phase information based on the expression (5) described below in S13.

Further, when the parameter calculating unit 7 determines that data which has phase information being within the range 1 exists in S11, it is determined that a forced chatter vibration had been generated before generation of the current regenerative type chatter vibration. Then, the parameter calculating unit 7 calculates new phase information based on the following expression (4) in S14. On the other hand, when the parameter calculating unit 7 determines that data which has phase information being within the range 1 do not exist, it is determined that a vibration other than the current vibration had not been generated before. Then, the parameter calculating unit 7 calculates new phase information based on the following expression (6) in S15.

$$\text{New phase information} = (\text{Current phase information} + \text{Phase information in a memory})/2 \quad (4)$$

$$\text{New phase information} = \text{Current phase information} + 0.6 \quad (5)$$

$$\text{New phase information} = 0 \quad (6)$$

The phase information in the memory in the expression (4) is phase information of data corresponding to that of S10 in S12, and is phase information of data corresponding to that of S11 in S14. In addition, when plural corresponding data exist, data having phase information which is closest to the current phase information are used.

Figure 5:
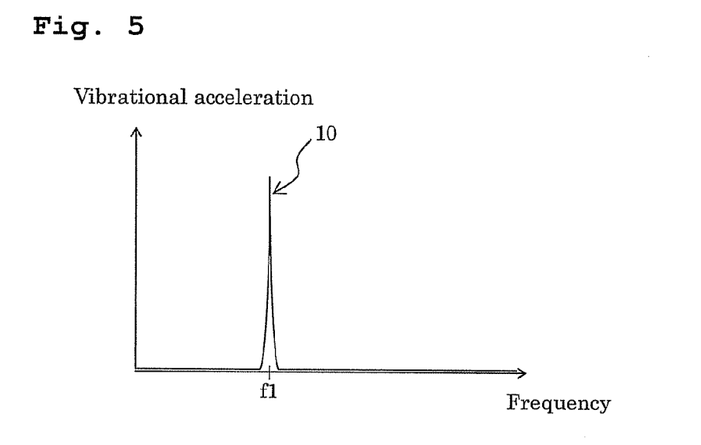
FIG. 5 is an explanatory diagram illustrating one example of a vibrational acceleration at a main spindle rotation speed by which phase information becomes a value closing to 0.
Figure 6:
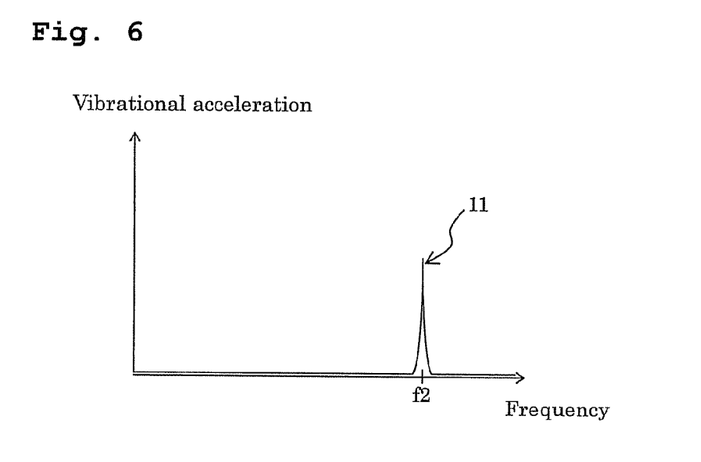
FIG. 6 is an explanatory diagram illustrating one example of a vibrational acceleration at a main spindle rotation speed by which phase information does not become a value closing to 0.

Further, the expression (4) is for a process when a forced chatter vibration and a regenerative type chatter vibration are generated according to the rotating number. For example, a forced chatter vibration having the maximum acceleration as shown with a numeral 10 in FIG. 5 may be generated at a frequency f1. At this time, as illustrated in FIG. 6, data of a regenerative type chatter vibration having the maximum acceleration as shown by a numeral 11 at a frequency f2 may exist before generation of the current vibration in the memory.

Figure 7:
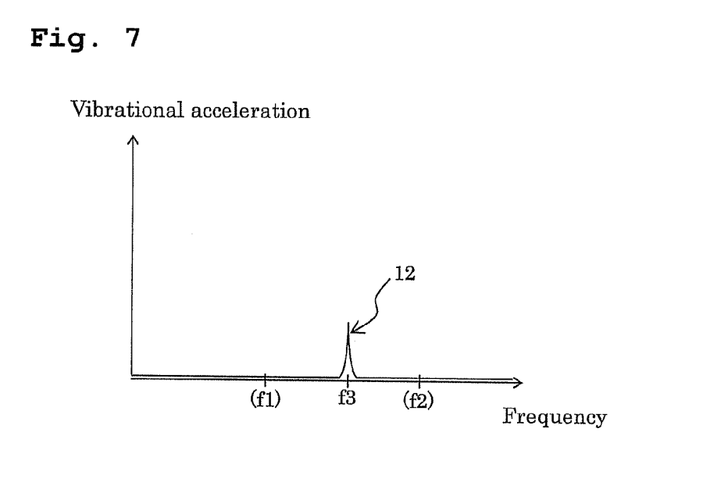
FIG. 7 is an explanatory diagram illustrating one example of a vibrational acceleration at a main spindle rotation speed by which phase information becomes an average value.

Then, in S12 and S14, the parameter calculating unit 7 calculates new phase information based on the expression (4)

so as to be an average value of the phase information as illustrated in FIG. 7 (the maximum acceleration shown by a numeral 12 is obtained at a frequency f3). The parameter calculating unit 7 calculates the optimum rotation speed based on this new phase information and changes the rotation speed. Thereby, both the chatter vibrations can be moderately suppressed. In addition, both the chatter vibrations can be moderately suppressed similarly when the regenerative type chatter vibration is generated at the frequency f1 and the forced chatter vibration is generated at the frequency f2.

In addition, generally, 0.5 capable of most effectively suppressing the forced chatter vibration is added to the current phase information in the expression (5). Here, the addition of 0.5 means reducing the rotary shaft rotation speed. If it is required to increase the rotary shaft rotation speed, −0.5 can be added, that is, 0.5 is subtracted.

Then, the parameter calculating unit 7 calculates a k1-value by adding the respectively calculated new phase information to the k-value based on the expression (7) described below in S16. The parameter calculating unit 7 calculates the optimum rotation speed by dividing the frequency of a chatter vibration by the product of the number of tool blades and the k1-value in S17. When the tool has eccentricity, the number of tool blades can be 1. This is because, when the eccentricity is generated, cutting force of each blade is different, and thus a frequency component synchronized with only the rotating number of a main spindle is generated as a frequency component of generated cutting force regardless of the number of tool blades, in addition to a frequency which is the integral multiple of the value obtained by a product of the main spindle rotating number and the number of tool blades.

$$k1\text{-value}=k\text{-value}+\text{New phase information} \quad (7)$$

$$\text{The optimum rotating number}=\text{Chatter frequency}/(\text{Number of tool blades}\times k1\text{-value}) \quad (8)$$

Then, in S18, the NC device 8 changes the rotation speed of the rotary shaft 3 so as to be made equal to the calculated optimum rotation speed. Thereby, prevention of amplification a "chatter vibration", that is, suppression is carried out.

Accordingly, the suppression control of the chatter vibration is performed in the control device 5.

As described above, the vibration suppressing device 9 of the above-described embodiment monitors a "chatter vibration" generated during rotating of the rotary shaft 3 on real time after the beginning of controlling this vibration. This monitoring is carried out by using the vibration sensors 2a to 2c, the FFT calculating unit 6, and the parameter calculating unit 7. Then, the device 9 immediately calculates the optimum rotation speed with the expressions (1) to (8) immediately after the generation of the chatter vibration is detected, and makes the rotation speed of the rotary shaft 3 equal to the optimum rotation speed, thereby suppresses amplification of the chatter vibration. That is, since the optimum rotation speed is calculated based on the "chatter vibration" generated in the actually rotating rotary shaft 3, the optimum rotation speed can be immediately calculated more precisely.

More particularly, when the device 9 calculates the optimum rotation speed, the parameter calculating unit 7 compares the calculated phase information with a predetermined constant and determines that a generated chatter vibration is a forced chatter vibration or a regenerative type chatter vibration. In addition, the parameter calculating unit 7 determines whether or not a chatter vibration which is different from the determined chatter vibration had been generated before generation of the current vibration from the phase information stored in a memory, and changes each k-value according to the determined chatter vibration and an existence of generation of the different chatter vibration so as to calculate the optimum rotation speed. Thus, when both the forced chatter vibration and the regenerative type chatter vibration are generated, the optimum stable rotation speed can be obtained, and thus a chatter vibration can be effectively suppressed. Therefore, accuracy of machining of surface can be kept to be high, and it can be expected to suppress the tool from wearing and prevent the tool from chipping.

Further, when the parameter calculating unit 7 determines that the generated chatter vibration is the forced chatter vibration and the regenerative type chatter vibration had been generated before generation of the current vibration, the parameter calculating unit 7 obtains a value calculated from the current phase information and phase information which is closest to the calculated phase information among stored phased information determined as the regenerative type chatter vibration, and makes this value be new phase information. When the regenerative type chatter vibration had not been generated before generation of the current phase information, the parameter calculating unit 7 obtains a value by adding a decimal value (0.5 or −0.5 in this case) by which the forced chatter vibration is not generated to the calculated phase information, and makes this value be new phase information. When the parameter calculating unit 7 determines that the generated chatter vibration is the regenerative type chatter vibration and the forced chatter vibration had been generated before generation of the current vibration, the parameter calculating unit 7 obtains a value calculated from the current phase information and phase information which is closest to the calculated phase information among stored phased information determined as the forced chatter vibration, and makes this value be new phase information. When the forced chatter vibration had not been generated before generation of the current vibration, the parameter calculating unit 7 makes the number of 0 be new phase information, and obtains a k1-value by adding the each new phase information to the calculated k-value. Thus, the k-value can be properly changed.

Particularly, when the forced chatter vibration is currently generated and the regenerative type chatter vibration had been generated before generation of the current vibration, and when the regenerative type chatter vibration is currently generated and the forced chatter vibration had been generated before generation of the current vibration, the parameter calculating unit 7 obtains an average value of the current phase information and phase information which is closest to the each calculated phase information, and makes this value be new phase information. Thus, new phase information can be easily obtained.

Further, the parameter calculating unit 7 calculates the optimum rotation speed by chatter frequency by the product of the number of tool blades and the k1-value. Thus, the optimum rotation speed can be properly calculated.

A structure according to the vibration suppressing device of the present invention is not limited to the above-described embodiment. Structures of detecting member, a control device, and control of vibration suppression in the control device can be properly modified if necessary without departing from the scope of the invention.

For example, when phase information, a k-value, a constant, and the relationship among them indicated in expressions (1) to (8) is properly checked and determined according to a type of a machine tool, the accuracy can be more improved. For example, in the above-described embodiment, the optimum rotation speed is calculated by using an average value of the phase information of the regenerative type chatter vibration and the forced chatter vibration as new phase information. However, the optimum rotation speed can be calculated by using the maximum acceleration at the time of generating each chatter vibration, weighting this value, and making this value be new phase information.

Further, the rotating number can be changed at a predetermined interval between phase information of each chatter vibration. When the rotating number is changed and the vibrating states are stored, the rotating number in which the maximum acceleration is the lowest can is to be the optimum rotation speed.

On the other hand, when the generated chatter vibration is determined to be the forced vibration and the regenerative type chatter vibration had been generated before generation of the current vibration, and when the generated chatter vibration is determined to be the regenerative type chatter vibration and the forced chatter vibration had been generated before generation of the current vibration, the optimum rotation speed can be calculated not using phase information. For example, a case that the regenerative type chatter vibration is generated at a current rotary shaft rotation speed of 1800 rpm and a memory stores a history in which forced chatter vibrations were generated at rotary shaft rotation speeds of 1000 rpm, 1500 rpm, and 2500 rpm is considered. In this case, instead of steps of S12 to S17, a vibration acceleration is weighted by the rotary shaft rotation speed of 1500 rpm, which is closest to the current rotary shaft rotation speed of 1800 rpm, and a rotation speed of 1600 rpm can be calculated as the optimum rotation speed or a rotation speed of 1650 rpm which is an average of both 1800 rpm and 1500 rpm can be calculated as the optimum rotation speed. Accordingly, the optimum stable rotation speed can be calculated with respect to both the forced and regenerative type chatter vibrations without using phase information.

Further, in the above-described embodiment, when carrying out the Fourier analysis of the time-domain vibrational accelerations detected by the detecting member, the suppressing of a chatter vibration is controlled by using a pinnacle in which the frequency-domain vibrational acceleration indicates the maximum. However, the device can calculate the optimum rotation speed by using plural pinnacles in which values of frequency-domain vibrational acceleration are in high order. Thereby, the suppressing effect of a chatter vibration can be more improved.

Further, in the above-described embodiment, the vibrational acceleration of a rotary shaft is detected by the detecting member, and the optimum rotation speed is calculated based on the detected vibrational acceleration. However, the device can detect a displacement or a sound pressure due to a vibration using the detecting member and calculate the optimum rotation speed based on the detected displacement or the sound pressure.

In addition, in the above-described embodiment, a vibration in a rotary shaft of a machine tool such as a machining center which rotates a tool is detected. However, the device can detect a vibration of a work which is on the side not rotating (the fixed side) or a vibration of a part near the work.

Furthermore, the present invention can be applied to a machine tool such as a lathe in which a work is rotated. In this case, the device can detect a vibration on a main spindle side, which corresponds to the rotary shaft and holds a work, or a vibration of a tool, which corresponds to a fixed side. In addition, of course, the attaching position, the number of attachment and the like of the detecting member can be properly modified corresponding to a type, a size, or the like of a machine tool.

What is claimed is:

1. A vibration suppressing device for a machine tool having a rotary shaft for suppressing a chatter vibration generated when a rotary shaft is rotated, the device comprising:

detecting member for detecting time-domain vibration due to the rotating rotary shaft;

calculating member for calculating a chatter frequency and a frequency-domain vibration at the chatter frequency based on the time-domain vibration detected by the detecting member, and calculating an optimum rotation speed of the rotary shaft capable of suppressing the chatter vibration, when the calculated frequency-domain vibration exceeds a predetermined threshold value, using a k-value and phase information, in which the k-value is an integer portion of a value obtained by dividing the frequency of chatter vibration by a product of the number of tool blades and the rotary shaft rotation speed and the phase information is a decimal part of the value obtained by dividing the frequency of chatter vibration by a product of the number of tool blades and the rotary shaft rotation speed;

storing member for storing the k-value and the phase information; and rotation speed controlling member for rotating the rotary shaft at the optimum rotation speed calculated by the calculating member and the storing member, wherein the calculating member compares the calculated phase information with a predetermined constant to determine whether a generated chatter vibration is a forced chatter vibration or a regenerative type chatter vibration, determines whether a chatter vibration different from the determined chatter vibration determined before the current vibration is generated by using the phase information stored in the storing member, and changes the k-value according to an existence of generations of the determined chatter vibration and the different chatter vibration, so as to calculate the optimum rotation speed.

2. The vibration suppressing device for the machine tool according to claim 1, wherein when the calculating member determines that the generated chatter vibration is the forced chatter vibration and the regenerative type chatter vibration had been generated before generation of the current vibration, the calculating member obtains a value calculated from the current phase information and phase information closest to the calculated phase information among stored phase information determined as the regenerative type chatter vibration, and makes this value be new phase information, wherein when the regenerative type chatter vibration had not been generated before generation of the current vibration, the calculating member obtains a value by adding a decimal value which does not generate the forced chatter vibration to the calculated phase information, and makes this value be new phase information, wherein when the calculating member determines that the generated chatter vibration is the regenerative type chatter vibration and the forced chatter vibration had been generated before generation of the current vibration, the calculating member obtains a value calculated from the current phase information and phase information closest to the calculated phase information among stored phase information determined as the forced chatter vibration, and makes this value be new phase information, and wherein when the forced chatter vibration had not been generated before generation of the current vibration, the calculating member makes the number of 0 be new phase information, and changes the k-value by adding the new phase information to the calculated k-value.

3. The vibration suppressing device for the machine tool according to claim 2, wherein the calculating member obtains an average value of the current phase information and phase information closest to the phase information calculated for respective cases where the forced chatter vibration is currently generated and the regenerative type chatter vibration has been generated before generation of the current vibration, and when the regenerative type chatter vibration is currently generated and the forced chatter vibration had been generated before generation of the current vibration, and makes this average value be new phase information.

4. The vibration suppressing device for the machine tool according to claim 1, wherein the calculating member calculates the optimum rotation speed by dividing the chatter frequency by the product of the number of tool blades and the changed k-value.

5. The vibration suppressing device for the machine tool according to claim 2, wherein the calculating member calculates the optimum rotation speed by dividing the chatter frequency by the product of the number of tool blades and the changed k-value.

6. The vibration suppressing device for the machine tool according to claim 3, wherein the calculating member calculates the optimum rotation speed by dividing the chatter frequency by the product of the number of tool blades and the changed k-value.

7. The vibration suppressing device for the machine tool according to claim 2, wherein the calculating member obtains a value calculated from the current rotary shaft rotation speed and a rotary shaft rotation speed closest to the current rotary shaft rotation speed among various rotary shaft rotation speeds determined as a chatter vibration different from the current vibration among stored spindle rotation speeds, and makes this value be the optimum rotation speed, when the calculating member determines that the generated chatter vibration is the forced chatter vibration and the regenerative type chatter vibration had been generated before generation of the current vibration, and when the calculating member determines that the generated chatter vibration is the regenerative type chatter vibration and the forced chatter vibration had been generated before generation of the current vibration.

8. The vibration suppressing device for the machine tool according to claim 2, wherein the calculating member obtains an average value of the current rotary shaft rotation speed and a rotary shaft rotation speed closest to the current rotary shaft rotation speed among various rotary shaft rotation speeds determined as a chatter vibration different from the current vibration among stored spindle rotation speeds, and makes this value be the optimum rotation speed, when the calculating member determines that the generated chatter vibration is the forced chatter vibration and the regenerative type chatter vibration had been generated before generation of the current vibration, and when the calculating member determines that the generated chatter vibration is the regenerative type chatter vibration and the forced chatter vibration had been generated before generation of the current vibration.

* * * * *